US012567740B2

(12) United States Patent
Nitta et al.

(10) Patent No.: US 12,567,740 B2
(45) Date of Patent: Mar. 3, 2026

(54) POWER SUPPLY DEVICE

(71) Applicants: JTEKT CORPORATION, Kariya (JP); TOYOTA JIDOSHA KABUSHIKI KAISHA, Toyota (JP)

(72) Inventors: Hiroki Nitta, Okazaki (JP); Tokuaki Hibino, Toyota (JP); Daiki Inaba, Okazaki (JP); Kohei Ota, Kariya (JP); Yosuke Yamashita, Nagoya (JP); Fumihiko Sato, Okazaki (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/748,487

(22) Filed: Jun. 20, 2024

(65) Prior Publication Data

US 2024/0429708 A1      Dec. 26, 2024

(30) Foreign Application Priority Data

Jun. 23, 2023      (JP) ................................. 2023-103470

(51) Int. Cl.
H02J 1/08 (2006.01)
B60R 16/033 (2006.01)
B62D 5/04 (2006.01)
(52) U.S. Cl.
CPC ............ H02J 1/086 (2020.01); B60R 16/033 (2013.01); B62D 5/0484 (2013.01)
(58) Field of Classification Search
CPC .. H02J 1/086; H02J 7/345; H02J 9/068; H02J 2207/50; B60R 16/033; B62D 5/0484
See application file for complete search history.

(56) References Cited

U.S. PATENT DOCUMENTS

| 2012/0025613 A1 | 2/2012 | Morita et al. |
| 2019/0103758 A1* | 4/2019 | Fukae ........................ H02J 7/34 |
| 2022/0294254 A1 | 9/2022 | Morita et al. |
| 2024/0128786 A1* | 4/2024 | Masuda ................ H01M 10/44 |

FOREIGN PATENT DOCUMENTS

| JP | 2023-018841 A | 2/2023 |
| JP | 2023-081123 A | 6/2023 |

OTHER PUBLICATIONS

Jan. 7, 2025 extended Search Report issued in European Patent Application No. 24183443.1.

* cited by examiner

*Primary Examiner* — Lincoln D Donovan
*Assistant Examiner* — Alex W Lam

(57) ABSTRACT

A control circuit of a power supply device forms a state in which an auxiliary power supply is connected via a charge circuit to a main power supply when a power switch provided on a power feeding path is turned on. The control circuit calculates an internal resistance of the auxiliary power supply based on a charging current. The control circuit forms a state in which the power supply device is disconnected from the main power supply and a power feeding target, and only the auxiliary power supply and a boost circuit are connected to each other when the power switch is turned off. The control circuit disconnects the auxiliary power supply from the boost circuit when a terminal voltage of the auxiliary power supply is less than a stop determination threshold value.

8 Claims, 3 Drawing Sheets

POWER SUPPLY DEVICE

CROSS-REFERENCE TO RELATED APPLICATION

This application claims priority to Japanese Patent Application No. 2023-103470 filed on Jun. 23, 2023, incorporated herein by reference in its entirety.

BACKGROUND

1. Technical Field

The present disclosure relates to a power supply device.

2. Description of Related Art

Power supply devices are known that back up power feeding to power feeding targets by using auxiliary power supplies when main power supplies fail. For example, a power supply device described in Japanese Unexamined Patent Application Publication No. 2023-18841 is provided in a power feeding path between a main power supply and a steering control device of a vehicle. The power supply device includes an auxiliary power supply and a charge circuit. The auxiliary power supply is a lithium-ion capacitor, for example. The charge circuit is a circuit for charging the auxiliary power supply. The charge circuit includes a boost circuit that boosts an output voltage of the main power supply.

SUMMARY

In the power supply device as described in JP 2023-18841 A, deterioration diagnosis is performed in some cases. For example, an internal resistance of the auxiliary power supply during charging is calculated, and the degree of deterioration of the auxiliary power supply is determined based on the calculated internal resistance. In order to ensure reliability of the diagnosis, it is required to ensure the calculation accuracy of the internal resistance.

A power supply device according to one aspect of the present disclosure including: an auxiliary power supply for a main power supply that supplies electric power to a power feeding target; a charge circuit disposed in a charge path between the main power supply and the auxiliary power supply, the charge circuit being configured to charge the auxiliary power supply by using the electric power from the main power supply; a boost circuit disposed in a discharge path between the auxiliary power supply and the power feeding target, the boost circuit being configured to boost an output voltage of the auxiliary power supply; and a control circuit configured to control opening and closing of the charge path and opening and closing of the discharge path. The control circuit is configured to form a state in which the auxiliary power supply is connected via the charge circuit to the main power supply when a power switch disposed in a power feeding path between the main power supply and the power feeding target is turned on, and to calculate an internal resistance of the auxiliary power supply based on a charging current supplied from the charge circuit to the auxiliary power supply. The control circuit is configured to form a state in which the power supply device is disconnected from the main power supply and the power feeding target and only the auxiliary power supply and the boost circuit are connected to each other when the power switch is turned off, and to disconnect the auxiliary power supply from the boost circuit when a voltage of the auxiliary power supply is less than a stop determination threshold value.

According to this configuration, the next time the power switch is turned on, the voltage of the auxiliary power supply becomes decreased to a level less than the stop determination threshold. Therefore, a sufficient charging current flows from the charge circuit to the auxiliary power supply. Accordingly, it is possible to ensure the calculation accuracy of the internal resistance.

In the above power supply device, the control circuit may be configured to be supplied with the electric power from the main power supply and supplied with electric power from the boost circuit by forming a state in which the auxiliary power supply and the boost circuit are connected to each other when the power switch is turned on, and be configured to be continuously supplied with the electric power from the boost circuit during a time period from when the power switch is turned off until the voltage of the auxiliary power supply becomes less than the stop determination threshold value.

According to this configuration, even when the supply of the electric power from the main power supply to the control circuit is stopped due to the turn-off of the power switch, the electric power from the boost circuit is supplied to the control circuit. Accordingly, the control circuit can continuously operate by consuming the electric power from the boost circuit.

In the above power supply device, in the case in which the power switch is turned on again during the time period from when the power switch is turned off until the voltage of the auxiliary power supply becomes less than the stop determination threshold value, the control circuit may be configured to perform no calculation of the internal resistance of the auxiliary power supply when the charging current is less than a current threshold value.

If a sufficient charging current does not flow, there is a risk that the calculation accuracy of the internal resistance of the auxiliary power supply cannot be ensured. According to the above configuration, it is possible to avoid unnecessary calculation of the internal resistance that cannot ensure the calculation accuracy.

In the above power supply device, in the case in which the power switch is turned on, the control circuit may be configured to perform no calculation of the internal resistance of the auxiliary power supply when the voltage of the auxiliary power supply is not less than the stop determination threshold value.

When the voltage of the auxiliary power supply is not less than the stop determination threshold, there is a risk that a sufficient charging current does not flow, so that the calculation accuracy of the internal resistance of the auxiliary power supply cannot be ensured. According to the above configuration, it is possible to avoid unnecessary calculation of the internal resistance that cannot ensure the calculation accuracy.

In the above power supply device, the power feeding target may include a control device of a vehicle. Higher operational reliability is required for the control device of the vehicle. The above power supply device is suitable for the control device of the vehicle.

According to the power supply device of the present disclosure, it is possible to ensure the calculation accuracy of the internal resistance of the auxiliary power supply.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
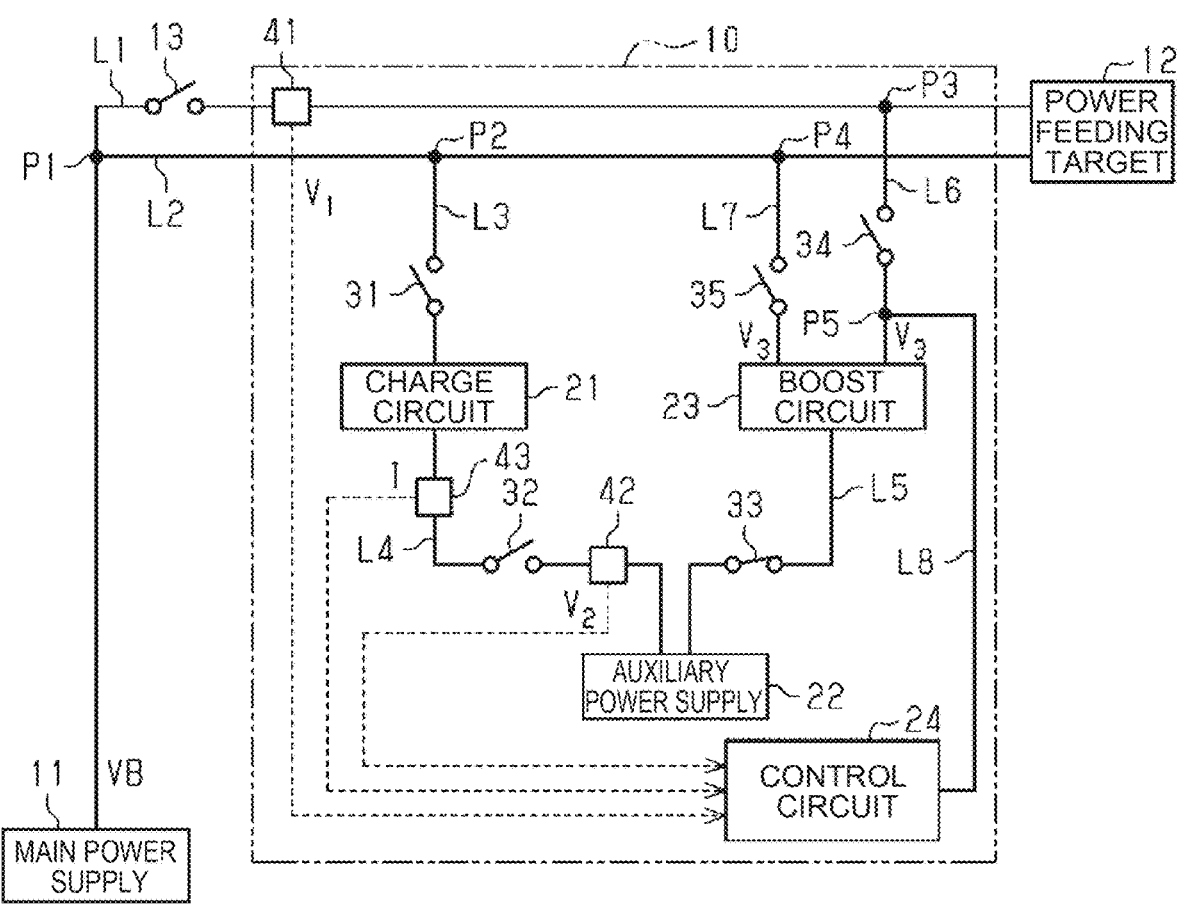
FIG. 1 is a circuit diagram of a power supply device according to one embodiment.

Hereinafter, one embodiment of a power supply device is described. As shown in FIG. 1, a power supply device 10 is provided in a power feeding path between a main power supply 11 and a power feeding target 12. The main power supply 11 is a battery, for example. The power feeding target 12 is, for example, a control device of a vehicle, which operates by consuming electric power supplied via the power supply device 10. The control device is, for example, a steering control device, which controls a motor as a driving source for a steering system of the vehicle. An example of the steering system is an electric power steering system or a steer-by-wire steering system.

The power feeding path includes a first power supply line L1 and a second power supply line L2. The second power supply line L2 branches from a first connection point P1 disposed in the first power supply line L1. The first connection point P1 is disposed between the main power supply 11 and a power switch 13 in the first power supply line L1.

Electric power of the main power supply 11 is supplied via the first power supply line L1, for example, to electric circuits of a power system of the power feeding target 12. The electric circuits of the power system are circuits that handle larger electric power and include an inverter that converts DC power of the main power supply 11 into AC power, and others, for example. The electric power of the main power supply 11 is also supplied via the second power supply line L2, for example, to electric circuits of a control system of the power feeding target 12. The electric circuits of the control system are, for example, circuits for controlling the motor, and include processing circuits such as microcomputers.

In the first power supply line L1, the power switch 13 is provided between the power supply device 10 and the main power supply 11. The power switch 13 includes, for example, an ignition switch, and is operated at the time of starting traveling of the vehicle. Through the operation of the power switch 13, energization of the first power supply line L1 is switched between on and off.

The first power supply line L1 and the second power supply line L2 configure a power feeding path between the main power supply 11 and the power feeding target 12.

Configuration of Power Supply Device 10

Next, the configuration of the power supply device 10 is described below. The power supply device 10 includes a charge circuit 21, an auxiliary power supply 22, a boost circuit 23, and a control circuit 24. The power supply device 10 also includes first to fifth switches 31 to 35, a first voltage sensor 41, a second voltage sensor 42, and a current sensor 43.

The charge circuit 21 is a circuit for charging the auxiliary power supply 22 using electric power from the main power supply 11. An input terminal of the charge circuit 21 is connected via a third power supply line L3 to a second connection point P2 disposed in the second power supply line L2. An output terminal of the charge circuit 21 is connected via a fourth power supply line L4 to the auxiliary power supply 22.

The auxiliary power supply 22 is a power storage device that is capable of charging and discharging electric charges, and a lithium ion capacitor or a lithium ion battery may be included as an example of the auxiliary power supply. A voltage of the auxiliary power supply 22 is set lower than a voltage of the main power supply 11. The voltage of the auxiliary power supply 22 and the voltage of the main power supply 11 are both terminal voltages and actual output voltages thereof.

The boost circuit 23 is a circuit for boosting the output voltage of the auxiliary power supply 22. The boost circuit 23 boosts the output voltage of the auxiliary power supply 22 to a voltage higher than the terminal voltage of the auxiliary power supply 22 and lower than the terminal voltage of the main power supply 11, for example. The input terminal of the boost circuit 23 is connected via a fifth power supply line L5 to the auxiliary power supply 22. The boost circuit 23 has two output terminals. A first output terminal of the boost circuit 23 is connected via a sixth power supply line L6 to a third connection point P3 disposed in the first power supply line L1. A second output terminal of the boost circuit 23 is connected via a seventh power supply line L7 to a fourth connection point P4 disposed in the second power supply line L2. The fourth connection point P4 is disposed between the second connection point P2 in the second power supply line L2 and the power feeding target 12.

The first switch 31 is provided in the third power supply line L3. The first switch 31 opens and closes the third power supply line L3. The second switch 32 is provided in the fourth power supply line L4. The second switch 32 opens and closes the fourth power supply line L4. The third switch 33 is provided in the fifth power supply line L5. The third switch 33 opens and closes the fifth power supply line L5. The fourth switch 34 is provided in the sixth power supply line L6. The fourth switch 34 opens and closes the sixth power supply line L6. The fifth switch 35 is provided in the seventh power supply line L7. The fifth switch 35 opens and closes the seventh power supply line L7.

The first voltage sensor 41 is provided between the power switch 13 and the third connection point P3 in the first power supply line L1. The first voltage sensor 41 detects a voltage $V_1$ generated in the first power supply line L1. The second voltage sensor 42 is provided between the second switch 32 and the auxiliary power supply 22 in the fourth power supply line LA. The second voltage sensor 42 detects a terminal voltage $V_2$ of the auxiliary power supply 22. The terminal voltage $V_2$ is a voltage actually output from the auxiliary power supply 22. The current sensor 43 is provided between the charge circuit 21 and the second switch 32 in the fourth power supply line L4. The current sensor 43 detects a current generated in the fourth power supply line L4, that is, a charging current I for the auxiliary power supply 22. The charging current I is a current supplied to the auxiliary power supply 22 when the auxiliary power supply 22 is charged.

The control circuit 24 is connected via the eighth power supply line L8 to a fifth connection point P5 disposed in the sixth power supply line L6. The fifth connection point P5 is disposed between the fourth switch 34 and the boost circuit 23 in the sixth power supply line L6. The control circuit 24 controls on and off of the first to fifth switches 31 to 35. The control circuit 24 detects on and off of the power switch 13 based on the voltage $V_1$ detected through the first voltage sensor 41. The control circuit 24 monitors the voltage of the main power supply 11. The control circuit 24 determines that a voltage VB of the main power supply 11 becomes decreased when a value of the voltage VB of the main power supply 11 is less than a predetermined voltage threshold value. The voltage threshold value is a reference for determining decrease in voltage of the main power supply 11.

The third power supply line L3 and the fourth power supply line L4 configure a charge path between the main power supply 11 and the auxiliary power supply 22. The fifth power supply line L5, the sixth power supply line L6, and the seventh power supply line L7 configure a discharge path between the auxiliary power supply 22 and the power feeding target 12. The control circuit 24 controls opening and closing of the charge path and the discharge path by controlling on and off of the first to fifth switches 31 to 35.

Operation of Power Supply Device 10

Next, the operation of the power supply device 10 is described below. As an initial state, the power switch 13 and the first to fifth switches 31 to 35 are turned off.

When the power switch 13 is turned on, electric power from the main power supply 11 is supplied via the first power supply line L1 to the electric circuits of the control system of the power feeding target 12. When the power switch 13 is turned on, the electric power from the main power supply 11 is also supplied to the control circuit 24 via a not-shown power supply line. The electric power from the main power supply 11 is supplied via the second power supply line L2 to the electric circuits of the power system of the power feeding target 12, regardless of whether the power switch 13 is turned on or off.

When the power switch 13 is turned on, the control circuit 24 turns on the first to fourth switches 31 to 34 while maintaining the fifth switch 35 in an off-state. Thus, the auxiliary power supply 22 is charged with the electric power from the main power supply 11 via the charge circuit 21. The charge circuit 21 controls the charging while monitoring the charging current and the charging voltage, for example.

The output voltage of the auxiliary power supply 22 is boosted by the boost circuit 23. When the voltage VB of the main power supply 11 does not decrease, a voltage V₃ boosted by the boost circuit 23 is lower than the voltage VB of the main power supply 11. Hence, the voltage V₃ boosted by the boost circuit 23 is not supplied via the sixth power supply line L6 and the first power supply line L1 to the electric circuits of the control system of the power feeding target 12. Between the third connection point P3 and the fourth switch 34 in the sixth power supply line L6, a not-shown first diode for preventing a reverse current is provided. The first diode prevents the electric power from flowing from the main power supply 11 via the first power supply line L1 and the sixth power supply line L6 into the boost circuit 23. The voltage boosted by the boost circuit 23 is supplied via the eighth power supply line L8 to the control circuit 24.

On the other hand, when the voltage VB of the main power supply 11 decreases, the electric power from the boost circuit 23 is immediately supplied via the sixth power supply line L6 and the first power supply line L1 to the electric circuits of the control system of the power feeding target 12. This is because, due to the decrease of the voltage VB of the main power supply 11, the voltage V₃ boosted by the boost circuit 23 becomes higher than the voltage of the main power supply 11 and thus higher than the voltage generated in the first power supply line L1. Hence, even when the power feeding from the main power supply 11 to the power feeding target 12 is interrupted, the power feeding to the electric circuits of the control system of the power feeding target 12 is backed up by the auxiliary power supply 22.

A not-shown second diode for preventing a reverse current is provided between the first voltage sensor 41 and the third connection point P3 in the first power supply line L1. The second diode prevents electric power from flowing from the boost circuit 23 via the sixth power supply line L6 and the first power supply line L1 into the main power supply 11.

The control circuit 24 turns on the fifth switch 35 when the voltage VB of the main power supply 11 decreases. As a result, the electric power from the boost circuit 23 is supplied via the seventh power supply line L7 and the second power supply line L2 to the electric circuits of the power system of the power feeding target 12. This is because, due to the decrease of the voltage VB of the main power supply 11, the voltage V₃ boosted by the boost circuit 23 becomes higher than the voltage of the main power supply 11 and thus higher than the voltage generated in the second power supply line L2. Therefore, even when the power feeding from the main power supply 11 to the power feeding target 12 is interrupted, the power feeding to the electric circuits of the power system of the power feeding target 12 is backed up by the auxiliary power supply 22.

A not-shown third diode for preventing a reverse current is provided between the second connection point P2 and the fourth connection point P4 in the second power supply line L2. The third diode prevents the electric power from flowing from the boost circuit 23 via the seventh power supply line L7 and the second power supply line L2 into the main power supply 11.

Processing of Deterioration Diagnosis of Auxiliary Power Supply 22

The control circuit 24 diagnoses deterioration of the auxiliary power supply 22 during charging of the auxiliary power supply 22. When the power switch 13 is turned on, the control circuit 24 determines the degree of deterioration of the auxiliary power supply 22 based on the internal resistance of the auxiliary power supply 22 during the charging. This is based on the fact that as the auxiliary power supply 22 becomes deteriorated, the internal resistance of the auxiliary power supply 22 increases. The internal resistance is an electric resistance inside the auxiliary power supply 22.

Figure 2:
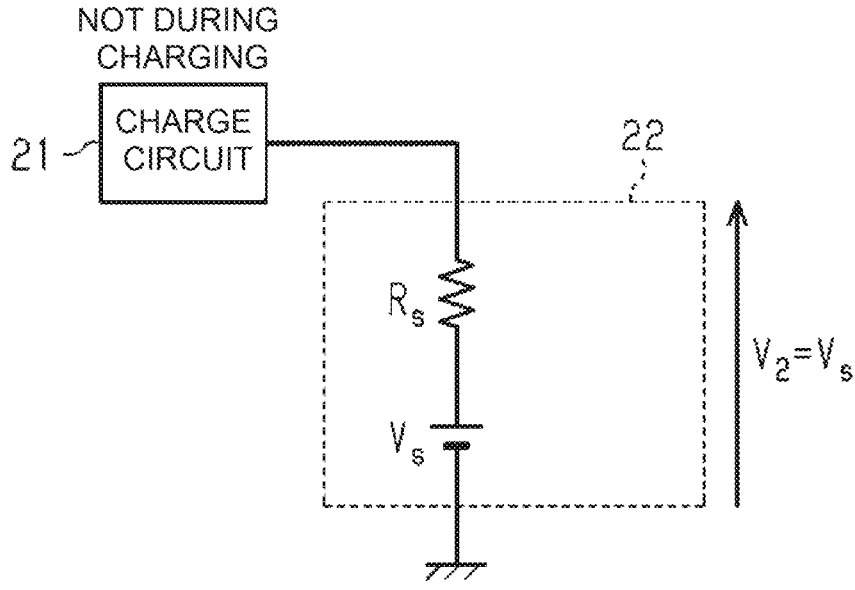
FIG. 2 is a circuit diagram of an auxiliary power supply according to one embodiment not during charging.

As shown in FIG. 2, the auxiliary power supply 22 can be represented by an electric circuit in which an electromotive force V_s and an internal resistance R_s are connected in series. The electromotive force V_s is a theoretical voltage of the auxiliary power supply 22. When the auxiliary power supply 22 is not charged, that is, when no charging current is supplied from the charge circuit 21 to the auxiliary power supply 22, no increase in voltage proportional to the internal resistance R_s is generated. Therefore, the terminal voltage V₂ of the auxiliary power supply 22 is theoretically equal to the electromotive force V_s. The terminal voltage V₂ is a voltage actually output from the auxiliary power supply 22.

Figure 3:
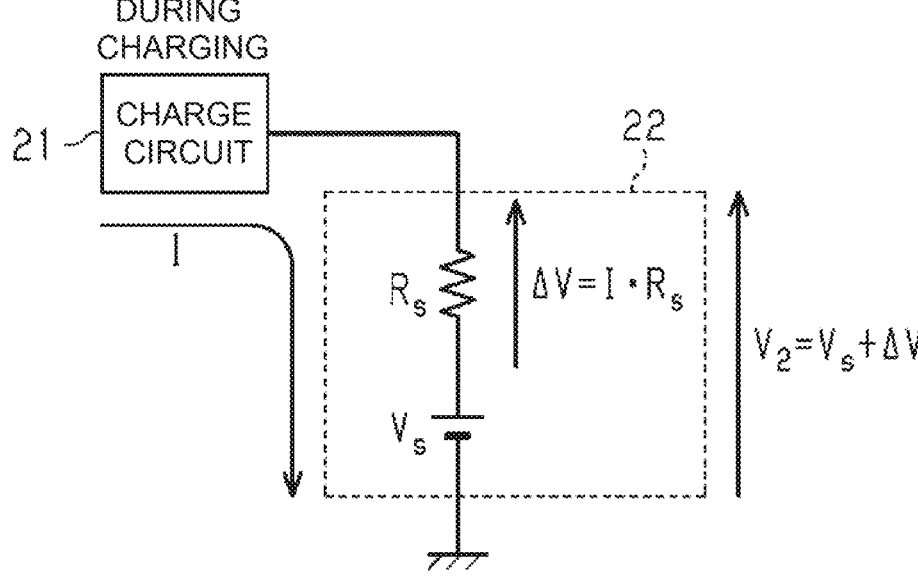
FIG. 3 is a circuit diagram of the auxiliary power supply according to one embodiment during charging.

As shown in FIG. 3, when the auxiliary power supply 22 is charged, that is, when the charging current I is supplied from the charge circuit 21 to the auxiliary power supply 22, an increase in voltage proportional to the internal resistance R_s is generated. Hence, during the charging of the auxiliary power supply 22, the terminal voltage V₂ of the auxiliary power supply 22 becomes higher than the electromotive force V_s by an increased voltage ΔV. The increased voltage ΔV is a voltage of the auxiliary power supply 22, which corresponds to amount increased due to the charging of the auxiliary power supply 22.

Figure 4:
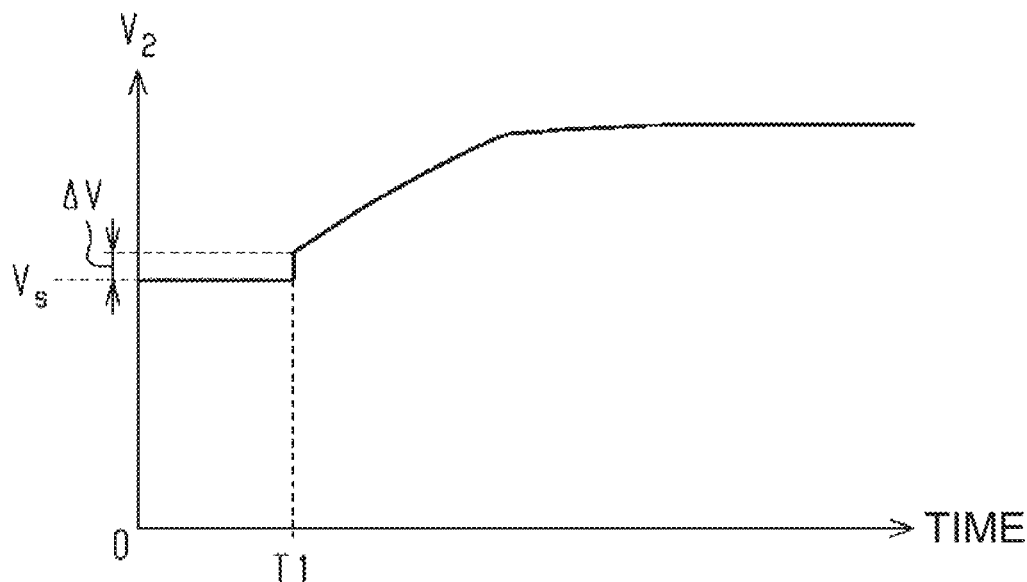
FIG. 4 is a graph showing an increase in voltage at the start of charging of the auxiliary power supply according to one embodiment.

As shown in FIG. 4, despite the charging method using the charge circuit 21, at the start of charging of the auxiliary power supply 22 (time T1), the terminal voltage $V_2$ of the auxiliary power supply 22 rises instantaneously. After this, the terminal voltage $V_2$ gradually increases along with progress of the charging and is eventually maintained at a constant voltage.

The voltage increase $\Delta V$ of the auxiliary power supply 22 during the charging is expressed by the following Equation (1). The symbol "·" in Equation (1) indicates multiplication.

$$\Delta V = I \cdot R_s \qquad (1)$$

The terminal voltage $V_2$ of the auxiliary power supply 22 during the charging is expressed by the following Equation (2).

$$V_2 = V_s + \Delta V \qquad (2)$$

The internal resistance $R_s$ is expressed by the following Equation (3). Equation (3) is obtained from the above Equation (1). The symbol "/" in Equation (3) indicates division.

$$R_s = \Delta V / I \qquad (3)$$

The control circuit 24 calculates the internal resistance $R_s$ of the auxiliary power supply 22 by using Equation (3). For example, the control circuit 24 determines that the auxiliary power supply 22 is deteriorated when the calculated internal resistance $R_s$ is greater than a predetermined resistance threshold value. When determining that the auxiliary power supply 22 is deteriorated, the control circuit 24 performs predetermined processing. The processing includes, for example, visually or audibly informing a user of the vehicle of deterioration of the auxiliary power supply 22.

However, when performing the diagnosis of deterioration of the auxiliary power supply 22 during the charging of the auxiliary power supply 22, there are the following concerns. That is, when the auxiliary power supply 22 is almost fully charged, the sufficient charging current I does not flow, so that a signal to noise ratio (SN ratio) of the current sensor 43 decreases, which might make it impossible to ensure the calculation accuracy of the internal resistance $R_s$ of the auxiliary power supply 22. Therefore, in the present embodiment, in order to ensure the calculation accuracy of the internal resistance $R_s$ of the auxiliary power supply 22, the control circuit 24 performs the following processing.

Processing to Ensure Calculation Accuracy of Internal Resistance $R_s$

When the power switch 13 is turned off, the control circuit 24 turns off the first switch 31, the second switch 32, the fourth switch 34, and the fifth switch 35. In other words, the control circuit 24 maintains only the third switch 33 in an on-state. Thus, the electric power from the auxiliary power supply 22 is continuously supplied to the boost circuit 23. As a result, the boost circuit 23 continues to operate. As the electric power of the auxiliary power supply 22 is consumed by the boost circuit 23, the amount of charging of the auxiliary power supply 22 gradually decreases. As the amount of the charging decreases, the terminal voltage $V_2$ of the auxiliary power supply 22 decreases.

The control circuit 24 operates by consuming electric power supplied from the boost circuit 23 via the eighth power supply line L8. The control circuit 24 determines whether or not the following Equation (4) is satisfied.

$$V_2 < V_{th}, \qquad (4)$$

where "$V_{th}$" is a stop determination threshold value. The stop determination threshold value $V_{th}$ is a reference for determining whether or not to completely stop the operation of the power supply device 10. The stop determination threshold value $V_{th}$ is set, for example, based on the terminal voltage $V_2$ of the auxiliary power supply 22 at which the charging current I is expected to sufficiently flow the next time the auxiliary power supply 22 is charged.

When the above Equation (4) is not satisfied, that is, when the terminal voltage $V_2$ of the auxiliary power supply 22 is equal to or more than the stop determination threshold value $V_{th}$, the control circuit 24 continuously maintains only the third switch 33 in the on-state. The electric power of the auxiliary power supply 22 is continuously consumed by the boost circuit 23.

When the above Equation (4) is satisfied, that is, when the terminal voltage $V_2$ of the auxiliary power supply 22 is less than the stop determination threshold value $V_{th}$, the control circuit 24 turns off the third switch 33. As a result, the supply of the electric power from the auxiliary power supply 22 to the boost circuit 23 is stopped, and thus the operation of the boost circuit 23 is stopped. When the operation of the boost circuit 23 is stopped, the supply of the electric power from the boost circuit 23 via the eighth power supply line L8 to the control circuit 24 is stopped. Hence, the operation of the control circuit 24 is also stopped. In other words, the operation of the power supply device 10 is stopped completely.

After this, when the power switch 13 is turned on again, the control circuit 24 turns on the first to fourth switches 31 to 34 while maintaining the fifth switch 35 in an off-state. The control circuit 24 calculates the internal resistance $R_s$ of the auxiliary power supply 22 by using the above Equation (3) based on the charging current I detected through the current sensor 43 and the terminal voltage $V_2$ of the auxiliary power supply 22 detected through the second voltage sensor 42. Since the terminal voltage $V_2$ of the auxiliary power supply 22 decreases to a level less than the stop determination threshold value $V_{th}$, the sufficient charging current I flows from the charge circuit 21 to the auxiliary power supply 22. Accordingly, the calculation accuracy of the internal resistance $R_s$ can be ensured.

Advantageous Effects of Embodiment

The present embodiment exerts the following advantageous effects. When the power switch 13 is turned on, the control circuit 24 turns on the first switch 31 and the second switch 32 so as to form a state in which the auxiliary power supply 22 is connected via the charge circuit 21 to the main power supply 11. The control circuit 24 calculates the internal resistance $R_s$ of the auxiliary power supply 22 based on the charging current I supplied from the charge circuit 21 to the auxiliary power supply 22. When the power switch 13 is turned off, the control circuit 24 turns off the first switch 31, the fourth switch 34, and the fifth switch 35 so as to disconnect the power supply device 10 from the main power supply 11 and the power feeding target 12. In addition, the control circuit 24 turns off the second switch 32 while maintaining the third switch 33 in the on-state so as to form a state in which only the auxiliary power supply 22 and the boost circuit 23 are connected to each other. When the terminal voltage $V_2$ of the auxiliary power supply 22 becomes less than the stop determination threshold value $V_{th}$, the control circuit 24 turns off the third switch 33 so as to disconnect the auxiliary power supply 22 from the boost circuit 23.

According to this configuration, the next time the power switch 13 is turned on, the terminal voltage $V_2$ of the auxiliary power supply 22 becomes decreased to a level less than the stop determination threshold value $V_{th}$. Hence, the sufficient charging current I flows from the charge circuit 21 to the auxiliary power supply 22. Accordingly, the calculation accuracy of the internal resistance $R_s$ of the auxiliary power supply 22 can be ensured. In addition, the deterioration diagnosis of the auxiliary power supply 22 can be properly performed before the vehicle travels at the timing of requiring the deterioration diagnosis of the auxiliary power supply 22. The reliability on the deterioration diagnosis can also be ensured.

After the power switch 13 is turned off, the electric power of the auxiliary power supply 22, which is consumed by the boost circuit 23, is small. Hence, it takes time for the terminal voltage $V_2$ of the auxiliary power supply 22 to decrease to a level less than the stop determination threshold value $V_{th}$. However, the terminal voltage $V_2$ of the auxiliary power supply 22 is adjusted under a condition where the vehicle is not used, for example, while being parked. Therefore, the adjustment of the terminal voltage $V_2$ of the auxiliary power supply 22 does not affect the operation of the vehicle system.

When the power switch 13 is turned on, the sufficient charging current I flows. Therefore, decrease in SN ratio of the current sensor 43 is reduced, thereby reducing deterioration of the detection accuracy of the current sensor 43. Accordingly, a high-precision current sensor 43 is unnecessary.

When the power switch 13 is turned on, the electric power from the main power supply 11 is supplied to the control circuit 24. When the power switch 13 is turned on, the control circuit 24 turns on the third switch 33 so as to form a state in which the auxiliary power supply 22 and the boost circuit 23 are connected to each other. Hence, the electric power from the boost circuit 23 is supplied to the control circuit 24. In addition, the electric power from the boost circuit 23 is continuously supplied to the control circuit 24 during a time period from when the power switch 13 is turned off until the terminal voltage $V_2$ of the auxiliary power supply 22 becomes less than the stop determination threshold value $V_{th}$. Therefore, even when the supply of the electric power from the main power supply 11 to the control circuit 24 is stopped due to the turn-off of the power switch 13, the control circuit 24 can continue to operate by consuming the electric power from the boost circuit 23.

When the auxiliary power supply 22 is discharged, that is, when the current is output from the auxiliary power supply 22, a voltage drop proportional to the internal resistance $R_s$ is caused. Hence, when the auxiliary power supply 22 is discharged, the terminal voltage $V_2$ of the auxiliary power supply 22 becomes lower than the electromotive force $V_s$ by a dropped voltage. The dropped voltage is a voltage of the auxiliary power supply 22, which corresponds to amount dropped due to the discharge of the auxiliary power supply

22. On the other hand, when the auxiliary power supply 22 is not discharged, that is, no current is output from the auxiliary power supply 22, no voltage drop proportional to the internal resistance $R_s$ is caused. Therefore, the terminal voltage $V_2$ of the auxiliary power supply 22 is equal to the electromotive force $V_s$.

Accordingly, it is also possible to determine the degree of deterioration of the auxiliary power supply 22 based on the internal resistance $R_s$ of the auxiliary power supply 22 during the discharging. However, in order to ensure the calculation accuracy of the internal resistance $R_s$ and thus the determination accuracy of the degree of deterioration of the auxiliary power supply 22, it is necessary to allow certain amount of a discharging current to flow. For this reason, the power supply device 10 is provided with a current path including a special component such as a large-capacity discharge resistor, for example. Providing the current path might cause increase in size or increase in product cost of the power supply device 10. In this regard, the case of determining the degree of deterioration of the auxiliary power supply 22 based on the internal resistance $R_s$ of the auxiliary power supply 22 during the charging requires no special component involved in the discharging. This is advantageous in size or product cost of the power supply device 10.

The power feeding target 12 includes the control device of the vehicle. Higher operational reliability is required for the control device of the vehicle. The power supply device 10 of the present embodiment is suitable for the control device of the vehicle.

Other Embodiments

The present embodiment may be implemented by the following modifications. In the case in which the power switch 13 is turned on again within the time period from when the power switch 13 is turned off until the terminal voltage $V_2$ of the auxiliary power supply 22 becomes less than the stop determination threshold value $V_{th}$, the control circuit 24 may not calculate the internal resistance $R_s$ of the auxiliary power supply 22 when the charging current I is less than the current threshold value. The current threshold value is set to a current value that is expected to ensure the calculation accuracy of the internal resistance $R_s$, through experiments or simulations. When the sufficient charging current I does not flow, the calculation accuracy of the internal resistance $R_s$ of the auxiliary power supply 22 might not be ensured. According to the above configuration, it is possible to avoid unnecessary calculation of the internal resistance that cannot ensure the calculation accuracy.

When the power switch 13 is turned on, the control circuit 24 may not calculate the internal resistance $R_s$ of the auxiliary power supply 22 when the terminal voltage $V_2$ of the auxiliary power supply 22 is not less than the stop determination threshold value $V_{th}$. When the terminal voltage $V_2$ of the auxiliary power supply 22 is not less than the stop determination threshold value $V_{th}$, there is a risk that the sufficient charging current I does not flow, so that the calculation accuracy of the internal resistance $R_s$ of the auxiliary power supply 22 cannot be ensured. According to the above configuration, it is possible to avoid unnecessary calculation of the internal resistance $R_s$ that cannot ensure the calculation accuracy.

What is claimed is:

1. A power supply device comprising:
an auxiliary power supply for a main power supply that supplies electric power to a power feeding target;

a charge circuit disposed in a charge path between the main power supply and the auxiliary power supply, the charge circuit being configured to charge the auxiliary power supply by using the electric power from the main power supply;

a boost circuit disposed in a discharge path between the auxiliary power supply and the power feeding target, the boost circuit being configured to boost an output voltage of the auxiliary power supply; and a control circuit configured to control opening and closing of the charge path and opening and closing of the discharge path, the control circuit being configured to form a state in which the auxiliary power supply is connected via the charge circuit to the main power supply when a power switch disposed in a power feeding path between the main power supply and the power feeding target is turned on, and to calculate an internal resistance of the auxiliary power supply based on a charging current supplied from the charge circuit to the auxiliary power supply, wherein the control circuit is configured to form a state in which the power supply device is disconnected from the main power supply and the power feeding target and only the auxiliary power supply and the boost circuit are connected to each other when the power switch is turned off, and to disconnect the auxiliary power supply from the boost circuit when a voltage of the auxiliary power supply is less than a stop determination threshold value, is configured to be supplied with the electric power from the main power supply and supplied with electric power from the boost circuit by forming a state in which the auxiliary power supply and the boost circuit are connected to each other when the power switch is turned on, and is configured to be continuously supplied with the electric power from the boost circuit during a time period from when the power switch is turned off until the voltage of the auxiliary power supply becomes less than the stop determination threshold value.

2. The power supply device according to claim 1, wherein, in a case in which the power switch is turned on again during the time period from when the power switch is turned off until the voltage of the auxiliary power supply becomes less than the stop determination threshold value, the control circuit is configured to perform no calculation of the internal resistance of the auxiliary power supply when the charging current is less than a current threshold value.

3. The power supply device according to claim 1, wherein in a case in which the power switch is turned on, the control circuit is configured to perform no calculation of the internal resistance of the auxiliary power supply when the voltage of the auxiliary power supply is not less than the stop determination threshold value.

4. The power supply device according to claim 1, wherein the power feeding target includes a control device of a vehicle.

5. A power supply device comprising:

an auxiliary power supply for a main power supply that supplies electric power to a power feeding target;

a charge circuit disposed in a charge path between the main power supply and the auxiliary power supply, the charge circuit being configured to charge the auxiliary power supply by using the electric power from the main power supply;

a boost circuit disposed in a discharge path between the auxiliary power supply and the power feeding target, the boost circuit being configured to boost an output voltage of the auxiliary power supply; and a control circuit configured to control opening and closing of the charge path and opening and closing of the discharge path, the control circuit being configured to form a state in which the auxiliary power supply is connected via the charge circuit to the main power supply when a power switch disposed in a power feeding path between the main power supply and the power feeding target is turned on, and to calculate an internal resistance of the auxiliary power supply based on a charging current supplied from the charge circuit to the auxiliary power supply, wherein the control circuit is configured to form a state in which the power supply device is disconnected from the main power supply and the power feeding target and only the auxiliary power supply and the boost circuit are connected to each other when the power switch is turned off, and to disconnect the auxiliary power supply from the boost circuit when a voltage of the auxiliary power supply is less than a stop determination threshold value, and wherein, in a case in which the power switch is turned on again during the time period from when the power switch is turned off until the voltage of the auxiliary power supply becomes less than the stop determination threshold value, the control circuit is configured to perform no calculation of the internal resistance of the auxiliary power supply when the charging current is less than a current threshold value.

6. The power supply device according to claim 5, wherein the control circuit is configured to be supplied with the electric power from the main power supply and supplied with electric power from the boost circuit by forming a state in which the auxiliary power supply and the boost circuit are connected to each other when the power switch is turned on, and is configured to be continuously supplied with the electric power from the boost circuit during a time period from when the power switch is turned off until the voltage of the auxiliary power supply becomes less than the stop determination threshold value.

7. The power supply device according to claim 5, wherein in a case in which the power switch is turned on, the control circuit is configured to perform no calculation of the internal resistance of the auxiliary power supply when the voltage of the auxiliary power supply is not less than the stop determination threshold value.

8. The power supply device according to claim 5, wherein the power feeding target includes a control device of a vehicle.

* * * * *